United States Patent [19]

McKenzie

[11] Patent Number: 4,723,437

[45] Date of Patent: Feb. 9, 1988

[54] SPRAYER AND NOZZLE CALIBRATOR

[75] Inventor: Wilmeth A. McKenzie, Fort Collins, Colo.

[73] Assignee: The Sprayer Calibrator Corporation, Fort Collins, Colo.

[21] Appl. No.: 836,954

[22] Filed: Mar. 6, 1986

[51] Int. Cl.$^4$ .................... G01M 19/00; G01F 25/00; G01F 15/18

[52] U.S. Cl. ......................................... 73/3; 73/861; 73/865.9; 73/168

[58] Field of Search ................ 73/1 R, 3, 432 V, 168, 73/432 R, 865.9, 432.1, 861

[56] References Cited

U.S. PATENT DOCUMENTS

| | | |
|---|---|---|
| 809,792 | 1/1906 | Eustis . |
| 1,889,705 | 11/1932 | Sherwood . |
| 2,790,320 | 4/1957 | Salko et al. ................................. 73/3 |
| 2,810,606 | 10/1957 | Taylor ........................... 73/1 R UX |
| 3,221,546 | 12/1965 | Heath ..................... 73/3 X |
| 3,675,481 | 7/1972 | Phillips . |
| 4,091,056 | 5/1978 | Hamalainen et al. ................ 73/3 X |
| 4,184,367 | 1/1980 | Jenney et al. ........................ 73/3 X |
| 4,194,386 | 3/1980 | Waters ..................... 73/3 |

OTHER PUBLICATIONS

"The Billion Dollar Blunder"; 5 page reprint from Apr. 1980 issue of *Successful Farming* with reproduction of material on a 6th page includes an insert entitled Pesticide Application Errors from *Farm Store Merchandising Magazine*, published by Mar. 1986; Larry Reichenberger, author of the longer article.

Holder publication entitled "Equipment for Testing Spraying Machines"; 8 pages; published by May 1987; Apparatus Used for Spray Nozzle Evaluation at the Weed Research Organization, *PANS*; vol. 20, No. 4, pp. 465-475; Dec. 1974; M. E. Thornton et al.

*Farm Industry News*; vol. 20: No. 2, pp. 46-51; "Top Products of 1986"; Jan Johnson; Feb. 1987 and No. 3, pp. 38-39; Now to Fine Tune Your Sprayer by Joseph Degnan; Mid Feb. 1987.

"Abstracts"; p. 16; *Agrichemical Age;* New Device Calibrates Boom Quickly and Easily; Oct.-Nov. 1986.

*Primary Examiner*—Tom Noland
*Attorney, Agent, or Firm*—Luke Santangelo

[57] ABSTRACT

By both an apparatus and a method for calibrating spray and nozzle equipment a temporary connection to such equipment is made and the flow of fluid is measured. Connection to the equipment is accomplished manually with an elastic doughnut having a progressively flaired surface and an inner sleeve. Flow is measured by a device which may be hand-held and is connected to the elastic doughnut in a flexible manner. Exiting fluid is directed by a flexible means which may be threadably attached to the apparatus by an ordinary garden hose connection.

24 Claims, 5 Drawing Figures

SPRAYER AND NOZZLE CALIBRATOR

BACKGROUND OF THE INVENTION

1. Field of the Invention

This invention relates to a portable, inexpensive means for instantaneously calibrating the flow of fluids from spray nozzles. It involves a device which may incorporate a gravity flowmeter connected by a hose which may be flexible to a pressure-fitting receptor for temporary connection by hand to fluid-disbursing nozzles such as are used in agriculture and industry.

2. Description of Related Art

An isolated gravity flowmeter designed for permanent mounting was described as early as 1932 by U.S. Pat. No. 1,889,705. Numerous variations of that basic device, including a gravity flowmeter similar in operation to that incorporated in the present invention, are well known and readily available. One such gravity flowmeter is described in U.S. Pat. No. 3,675,481. These flowmeters have not been used in a portable context, have not been used in conjunction with a hand-held receptor such as is described herein, and apparently have not been previously applied in the context of calibrating the flows from nozzles of agricultural and industrial spraying equipment.

One type of fluid-disbursing nozzle to which an application of the invention described herein is directed is the subject of U.S. Pat. No. 3,858,812. This nozzle is characteristic of a type of nozzle to which the present invention applies in that the end or face from which fluid is disbursed is irregularly shaped thus making it more difficult to create an acceptable seal between the nozzle to be calibrated and the receptor portion of the present invention. This irregular shape is characterized by surfaces whose planes are both perpendicular and parallel to the central direction that fluid is emitted from the nozzle.

A receptor for use in an unrelated context is described in U.S. Pat No. 809,792 as a pipe-coupling. This pipe-coupling is designed to itself grip the smooth discharge ends of faucets in a manner in which the pressure of liquid in the casing aids the grip of the pipe-coupling. Not only is the pipe-coupling designed for connection to smooth discharge ends of faucets, but it also is designed to retain itself to the faucet.

Prior to the present invention, it has been the traditional technique to calibrate nozzles by simply measuring the amount of fluid sprayed over a period of time such as 15 seconds to as much as 5 minutes. While this technique is simple to accomplish, it has the distinct disadvantages of being relatively slow and of requiring longer periods of time for nozzles designed for lower flow rates. These limitations have long been recognized and yet prior to the present invention, an inexpensive, accurate alternative has not been available. This has been despite a recognition by those skilled in the art that by far the biggest factor in misapplying agricultural chemicals—a problem which has been estimated to cost farmers a billion dollars a year—is calibration error in equipment. While efforts have been made to alleviate the problem of calibrating equipment accurately, efforts by those skilled in the art have been directed toward increasingly complex and expensive electronic monitoring and control devices. Of considerable concern in this regard has been the ability to avoid the introduction of error in the connection of any calibration device to the nozzle to be calibrated. Such error is frequently the result of the admission of outside air into the device or the leakage of fluid from the device at the connection to the nozzle. The receptor described herein permits an unexpectedly good connection to the nozzle to be calibrated in that it neither admits a significant amount of outside air nor leaks a significant amount of fluid. This allows readings with accuracy previously unavailable by simple, inexpensive devices.

SUMMARY OF THE INVENTION

The present invention relates, among other things, to both a method for calibrating fluid-disbursing nozzles and a device to accomplish such calibration. It is the object of this invention to provide both a technique and a device with which one person can simply, instantaneously, and accurately calibrate a particular nozzle by means of a portable, inexpensive, and rugged device. Both the method and the device may involve a portable gravity flowmeter, which may be hand-held, and which may be momentarily connected, also possibly by hand, to the fluid-disbursing nozzle to be calibrated. The connection to the nozzle is accomplished in a manner which both emits little or no air and leaks little or no fluid. In the preferred embodiment, this is accomplished by a means of a receptor incorporating a flexible, elastic doughnut of a design which is appropriate for connection to nozzles currently used in both agriculture and industry.

Further aspects of the present invention may include an exit hose connected to the discharge portion of the flowmeter by a connection which may be compatible with an ordinary garden hose for simplicity.

BRIEF DESCRIPTIONS OF THE DRAWINGS

DESCRIPTION OF THE PREFERRED EMBODIMENT

Figures 1, 2:
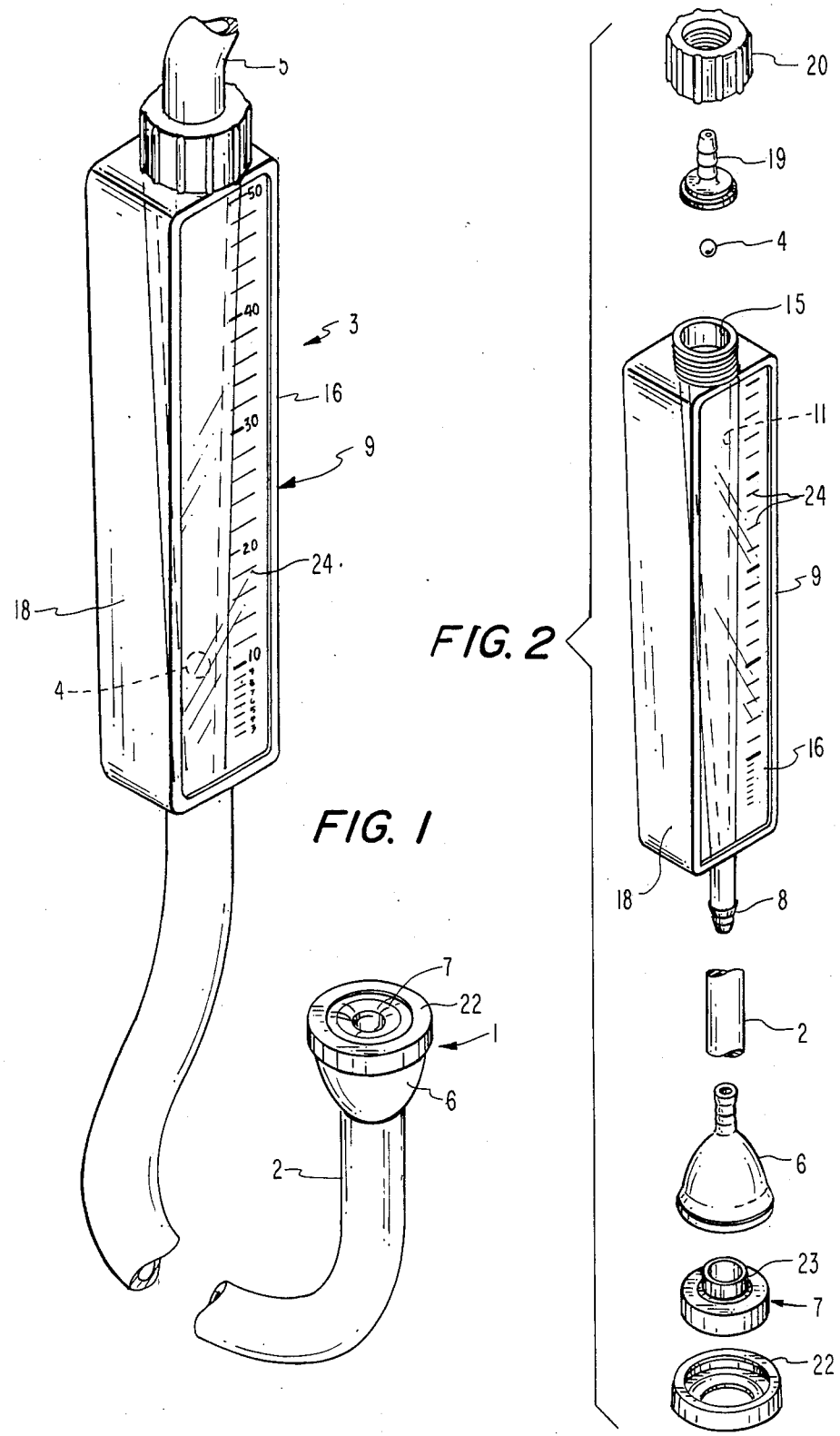
FIG. 1 is an overall view of the entire device embodying the present invention.
FIG. 2 is an expanded view of the device.

With reference to the drawings, the preferred embodiments of the present invention are described as follows:

Referring to FIG. 1, an overall view of the entire device, the present invention, in a general sense, incorporates a receptor 1 connected by some means to the intake portion of a flowmeter such as a gravity flowmeter 3.

The device is designed to be connected to the nozzle to be calibrated by a receptor 1. The receptor 1 comprises an outer body 6, a pliable, elastic doughnut 7, and a means for retaining said doughnut 22. The outer body 6 is of a conical design having first and second ends and may be constructed of any suitable rigid material for reasons as will be evident. One end of the outer body 6 should be conically shaped with its largest inner diameter corresponding to the outer diameter of the doughnut 7. The conical shape of the outer body 6 thus causes any pressure forcing the doughnut 7 into the outer body 6 to be increasingly resisted thus causing the doughnut 7 to seal tighter against the outer body 7. The narrow end of the outer body is of such a design as to permit attachment of the receptor 1 to a flowmeter such as a gravity flowmeter 3 by some means. As shown in FIG. 1, in the preferred embodiment the receptor 1 is attached to the gravity flowmeter 3 by means of a flexible hose 2. In the preferred embodiment, the narrow end of the outer body 6 has external irregularities 21 to allow attachment of the flexible hose 2 by pressure fitting the flexible hose 2 over the narrow end of the outer body 6.

Figures 3, 4:
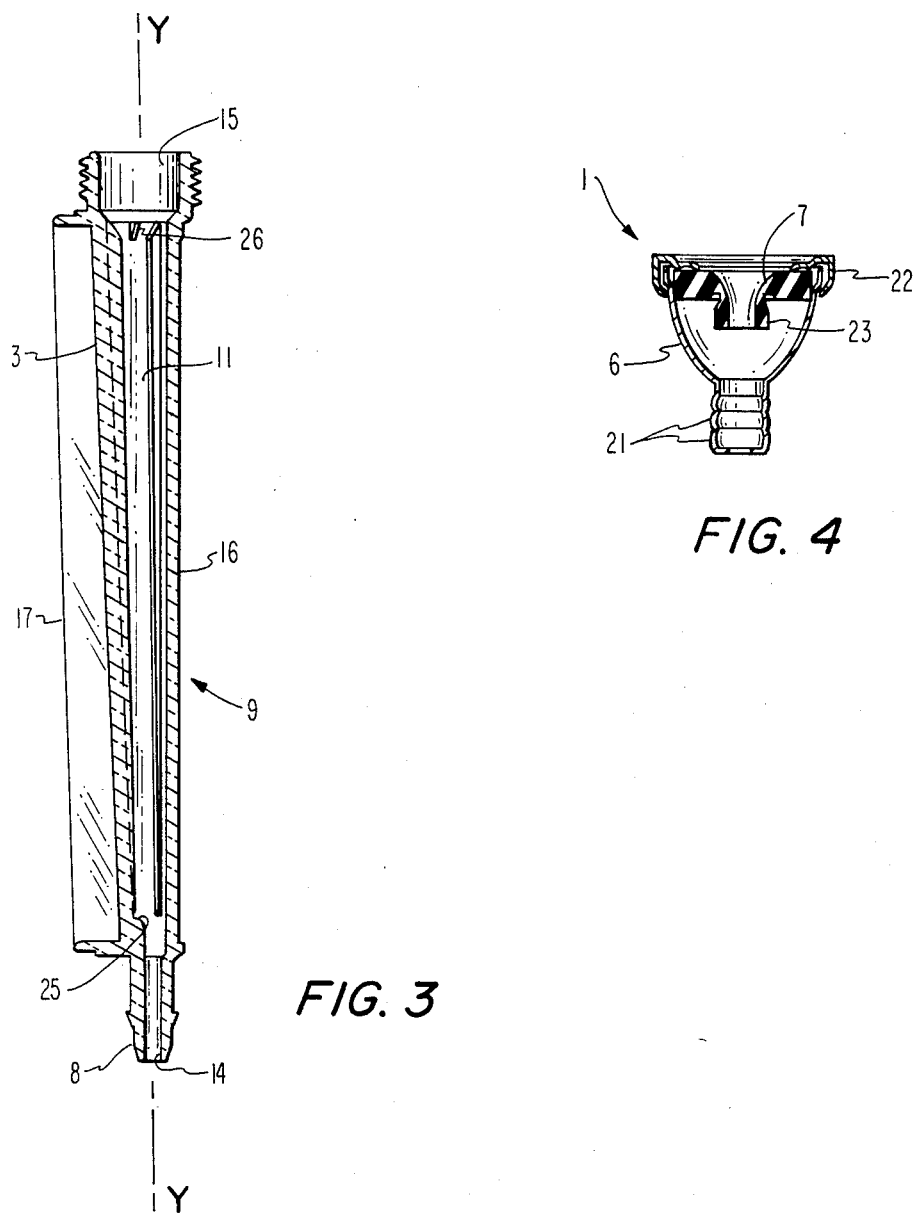
FIG. 3 is a cross-section view of the flowmeter portion of the device along a plane extending through the central axis shown in FIG. 2 and perpendicular to the flowmeter face.
FIG. 4 is a cross-section view of the receptor portion of the device along a plane extending through the central axis shown in FIG. 2.
Figure 5:
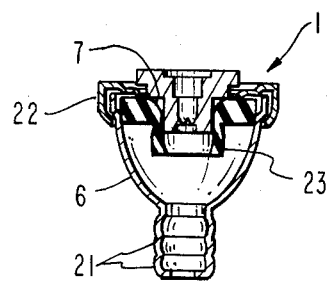
FIG. 5 is a cross-section view of the receptor portion of the device as shown in FIG. 4 when held against a typical nozzle.

As shown in FIG. 4 the pliable, elastic doughnut 7 has an outer diameter corresponding to the maximum inner diameter of the outer body 6. The inner diameters of the doughnut 7 are varied in a progressively flaired manner so that the inner diameters and the flat external surface of the doughnut are responsive to the nozzles to be calibrated. In this fashion external pressure on the rigid outer body 6 will be transferred to the portions of the doughnut 7 which contact the nozzle to be calibrated thus forming a seal against said nozzle. As can be seen in FIG. 4 the doughnut 7 has an inner sleeve 23 which extends downward into the outer body 6 with greatly reduced outer diameter thus increasing flexibility as the nozzle to be calibrated is pushed further into the receptor 1. The doughnut 7 is secured in place by some means such as a metal ring 22 as is shown in the preferred embodiment illustrated by FIG. 4.

The means for connecting the receptor 1 to the gravity flowmeter 3 may be a flexible hose 2 so that the receptor 1 may be held at any angle against a nozzle to be calibrated while allowing the gravity flowmeter 3 to be held in a vertical position in a manner that a plane extending through line Y—Y in FIG. 3 is parallel to the direction of the earth's gravitational field at all times during use. Naturally, in the event that an embodiment of the present invention is to be used only for calibration of a specific nozzle configuration, the means for connecting the receptor 1 to the gravity flowmeter 3 may be nonflexible so as to ease operation of the device and so as to aid in ensuring that the gravity flowmeter 3 is held in the vertical position. Such a non-flexible means for connecting the receptor 1 to the gravity flowmeter 3 could, of course, include connecting said receptor 1 directly to the gravity flowmeter 3 by some means. In the embodiment shown in the drawings, the flexible hose 2 is attached to the gravity flowmeter 3 by utilization of a nipple design. As shown in FIG. 2 and FIG. 3, the flowmeter nipple 8 is designed so as to allow the flexible hose 2 to be slipped onto the gravity flowmeter 3 and held in place in a manner that resists any tendency to become detached from the gravity flowmeter 3 while at the same time establishing a seal against the gravity flowmeter 3. A similar means for connecting the flexible hose 2 to the receptor 1 may also be utilized. For simplicity of construction, however, the preferred embodiment incorporates corrugations 21 at the narrow end of the outer body 6. Naturally, the means for connecting the flexible hose 2 to either the receptor 1 or the gravity flowmeter 3 may involve other techniques such as threadably connecting the items, such as bonding the items together by use of an adhesive, such as welding, such as incorporating a clamp to secure said connection, or otherwise.

While any type of flowmeter may be incorporated in the present invention, in the preferred embodiment of the present invention, the flowmeter is a gravity flowmeter 3. This gravity flowmeter 3 is of a unitary design capable of being injection molded through the use of any appropriate material such as a plastic. As with the entire device, the material from which the gravity flowmeter 3 is constructed may be varied to suit the device's intended use; for instance, if the device is to be used to calibrate nozzles which emit jet fuel, a material which resists corrosion by jet fuel should be chosen. A limitation on the choice of materials is that such material should be sufficiently translucent to permit recognition of the placement of the indicator 4 within the gravity flowmeter 3. The unitary design of the gravity flowmeter 3 comprises an input portion 14, an output portion 15, and a main body 9 having a flowmeter face 16, a back 17, and sides 18. Molded into one or both sides of the flowmeter face 16 are calibration markings 24. The flowmeter sides 18 are molded in such a manner as to readily accept a back cover to enclose the flowmeter back. Internal to the main body 9 the molded portion of the gravity flowmeter 3 surrounds a cavity 11 in which an indicator 4 is free to move. This cavity 11 is of a tapered design so as to present a cross-sectional area of the cavity 11 along a plane perpendicular to line Y—Y of FIG. 3 which varies as such cross-sectional area is moved from the input portion 14 to the output portion 15 of the gravity flowmeter 3. The manner in which such cross-section area varies as it is moved along line Y—Y to the output portion 15 may, of course, be altered as appropriate to the range or ranges of flows intended and may also be discontinuous. In the preferred embodiment shown in FIG. 3 such cross-sectional area varies in an approximately linear fashion for simplicity. The cavity 11 is designed to surround and guide an indicator 4. This indicator 4 may be of spherical, cylindrical, conical, or other design and constructed of various materials so as to move within said cavity 11 responsive to the rates of flow passing through the gravity flowmeter 3 as desired. Constructing such indicator of materials with different densities allows variation of the calibration range of the flowmeter by merely changing from one indicator to another. This feature in conjunction with different molded calibration markings 24 on either side of the flowmeter face 16 will allow one flowmeter main body 9 to serve different calibration rates of flow.

The indicator 4 is confined within the cavity 11 by an abrupt protrusion into the cavity or a decrease in the cross-sectional area at both the input portion 14 and output portion 15 of the gravity flowmeter 3. At the input portion 14 such a protrusion or decrease in cross-sectional area is accomplished by a discontinuity 25 in the shape of the unitary molded main body 9. While such a protrusion or decrease in cross-sectional area may also be molded into the main body 9 at the output portion 15, it may also be accomplished by means of an insert. In the preferred embodiment, such a protrusion or decrease in cross-sectional area is accomplished by means of a removable hose barb 19 which is attached to the output portion 15 of the flowmeter 3 by means of a hose nut 20. The use of the hose barb 19 is by no means the only technique available to decrease the cross-sectional area. An ordinary washer or a tubing flange may also be incorporated so long as the inner diameter is sufficiently small to restrict any passage of the indicator 4. The hose barb 19 is preferred for the simplicity it offers in combining the capabilities of restricting the indicator 4 and providing a means for connecting an exir hose 5 to the flowmeter, among other advantages. Utilization of such inserts not only greatly simplifies manufacture of the flowmeter main body 9, but it also facilitates removal of the indicator 4 for cleaning or exchange.

The hose barb 19 is attached to the output portion 15 of the flowmeter 3 by some means, which is preferably removable. In the preferred embodiment shown in FIG. 2, this means is a threaded hose nut 20. Although the hose nut 20 may be secured in other fashions, in the preferred embodiment both the hose nut 20 and the output portion 15 of the flowmeter 3 for simplicity have threads compatible with those of ordinary ½ inch, 5/8 inch, and ¾ inch garden hoses such as American National Standard Specifications ANSI D2.4-1966 (R 1974) threads, and 0.50-11.5 NH, 0.625-11.5 NH, and 0.75-11.5 NH threads. This combination of hose barb 19 and hose nut 20 not only greatly simplifies the manufacture of the gravity flowmeter, but it also facilitates removal and exchange of the indicator 4. As illustrated in FIG. 3 the cavity 11 is designed so that the cross sectional area abruptly increases in the output portion 15 of the flowmeter 3. This abrupt increase permits the maximum calibration limit of the flowmeter to be exceeded by some margin before the indicator 4 comes in contact with the hose barb 19, thus offering a simply manufactured means for allowing fluid to pass through the gravity flowmeter 3 even after its maximum flow rate has been exceeded by some margin. In order to prevent even temporary lodging of the indicator 4 in the area of increased cross sectional area discussed above, the gravity flowmeter 3 includes guides 26 which are molded into the main body 9 and which present sloping surfaces 26 to the indicator when the gravity flowmeter 3 is held in the vertical position.

A means for directing the exiting fluid is attached to the main body 9 of the gravity flowmeter 3. While this means may be integral to the main body 9, in the preferred embodiment exiting fluid is directed by an exit hose 5 which is attached to the hose barb 19. The exit hose 5 may be flexible so as to permit directing the exiting fluid in any direction desired.

I claim:

1. A method for temporarily sealing a system to an irregularly-shaped nozzle comprising the steps of:
   a. connecting a receptor having an exposed elastic doughnut to the system; and
   b. pressing the receptor against the irregularly-shaped nozzle to temporarily create a seal between the nozzle and the system wherein said elastic doughnut has an exposed surface which is progressively flared to allow contact against surfaces of the nozzle to be calibrated, such surfaces of said nozzle being both perpendicular and parallel to the central direction of flow of fluid from said nozzle and wherein said elastic doughnut further comprises an inner sleeve having an outer diameter that is greatly reduced from that of other portions of the elastic doughnut.

2. A method of calibrating a fluid-emitting nozzle comprising the steps of:
   a. sealing a flowmeter temporarily to the nozzle to be calibrated; and
   b. reading the indication on the flowmeter as fluid passes therethrough; and
   c. holding the flowmeter by hand while accomplishing the step of reading the indicator on the flowmeter.

3. A method of calibrating a fluid-emitting nozzle as described in claim 2 wherein said step of sealing the flowmeter to the nozzle is accomplished by means of a receptor having a progressively flared elastic doughnut and wherein said doughnut elastic further comprises an inner sleeve having a greatly reduced outer diameter in comparison to the maximum outer diameter of said elastic doughnut.

4. A method of calibrating a fluid-emitting nozzle as described in claim 3 wherein said step of sealing the flowmeter to the nozzle by means of a receptor further comprises the step of manually pressing the receptor against the nozzle.

5. A method of calibrating a fluid-emitting nozzle as described in claims 2, 3, or 4 wherein said step of sealing the flowmeter utilizes a gravity flowmeter and wherein said step of holding the flowmeter further involves the step of maintaining the gravity flowmeter in a vertical position.

6. A method for calibrating agricultural spray equipment having at least one nozzle comprising the steps of:
   a. connecting a receptor to a flowmeter;
   b. manually pressing the receptor against the nozzle; while simultaneously
   c. manually holding the flowmeter capable of indicating rates of flow of a fluid; while simultaneously
   d. reading the indication on the flowmeter; and
   e. summing the indications for each nozzle on said agricultural spray equipment.

7. A method for calibrating agricultural spray equipment as described in claim 6 wherein said step of connecting a receptor to a flowmeter utilizes a gravity flowmeter and further including the step of maintaining the flowmeter in a vertical position while simultaneously reading the indication on the flowmeter.

8. A method as described in claims 2, 3, 4, 6, or 7 further comprising the step of directing the fluid exiting from the flowmeter by means of a flexible hose.

9. A sprayer calibrator for measuring the flow of a fluid emitted by the nozzle, comprising:
   a. A receptor, comprising:
      (1) a rigid outerbody;
      (2) an elastic doughnut responsive to the nozzle to be calibrated and contained within the outerbody and having an exposed surface; and
      (3) a means for retaining the elastic doughnut within the outerbody;
   b. a flowmeter having input and output portions; and
   c. a means for connecting the receptor to the input portion of the flowmeter.

10. A sprayer calibrator as described in claim 9 wherein said exposed surface of the elastic doughnut is progressively flared to allow contact against surfaces of the nozzle to be calibrated, such surfaces of said nozzle being both perpendicular and parallel to the central direction of flow of fluid from said nozzle.

11. A sprayer calibrator as described in claim 10 wherein said elastic doughnut further comprises an inner sleeve having an outer diameter that is greatly reduced from that of other portions of the elastic doughnut.

12. A sprayer calibrator as described in claims 9, 10 or 11 wherein said flowmeter is a gravity flowmeter having an indicator, input and output portions, and a main body surrounding a cavity.

13. A sprayer calibrator as described in claim 12, wherein said receptor is designed to be manually placed against the nozzle.

14. A sprayer calibrator as described in claim 12 wherein said gravity flowmeter is designed to be hand held.

15. A sprayer calibrator as described in claim 12 wherein said gravity flowmeter comprises a removable means for containing said indicator which also permits connection of a hose to the output portion of the gravity flowmeter.

16. A sprayer calibrator as described in claim 15 wherein said main body surrounds a cavity having a cross sectional area which continuously varies throughout most of its length but which discretely increases near the output portion of the main body.

17. A sprayer calibrator as described in claim 16 wherein said gravity flowmeter further comprises a hose nut to attach said removable means for containing the indicator by means of ordinary garden hose threads.

18. A sprayer calibrator as described in claim 15 wherein said gravity flowmeter further comprises a hose nut to attach said removable means for containing the indicator by means of ordinary garden hose threads.

19. A sprayer calibrator as described in claims 9, 10, or 11 wherein said means for connecting the receptor to the flowmeter comprises a flexible hose.

20. A sprayer calibrator as described in claims 9, 10, or 11 further comprising a means for directing the fluid exiting the flowmeter.

21. A sprayer calibrator as described in claim 20 wherein said means for directing the fluid comprises a flexible exit hose.

22. A sprayer calibrator as described in claim 20 wherein said means for directing the fluid exiting the flowmeter is threadably attached to the flowmeter by an ordinary garden hose connection.

23. A sprayer calibrator as described in claim 22 wherein said flowmeter is a gravity flowmeter having an output portion, a main body surrounding a cavity, and an indicator.

24. A sprayer calibrator as described in claim 23 wherein said gravity flowmeter further comprises a means for containing the indicator within the cavity which also permits connection of said flexible exit hose to the output portion of the main body.

* * * * *